Sept. 23, 1969  E. E. HEWITT  3,468,732
METHOD OF BUTT JOINING THERMOPLASTIC SHEET MATERIAL
BY A SPIN WELDING OPERATION
Filed Aug. 19, 1966  2 Sheets-Sheet 1
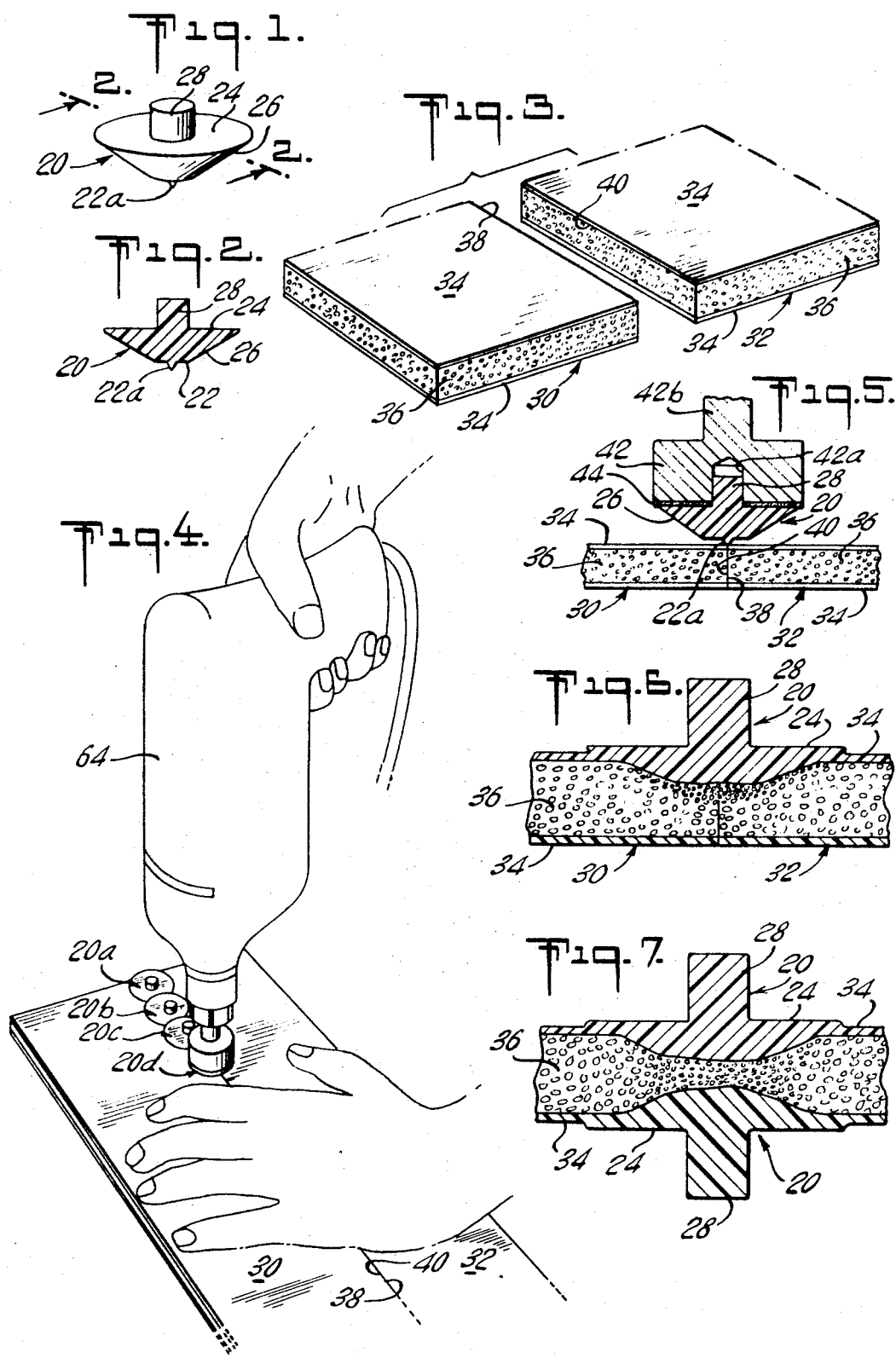

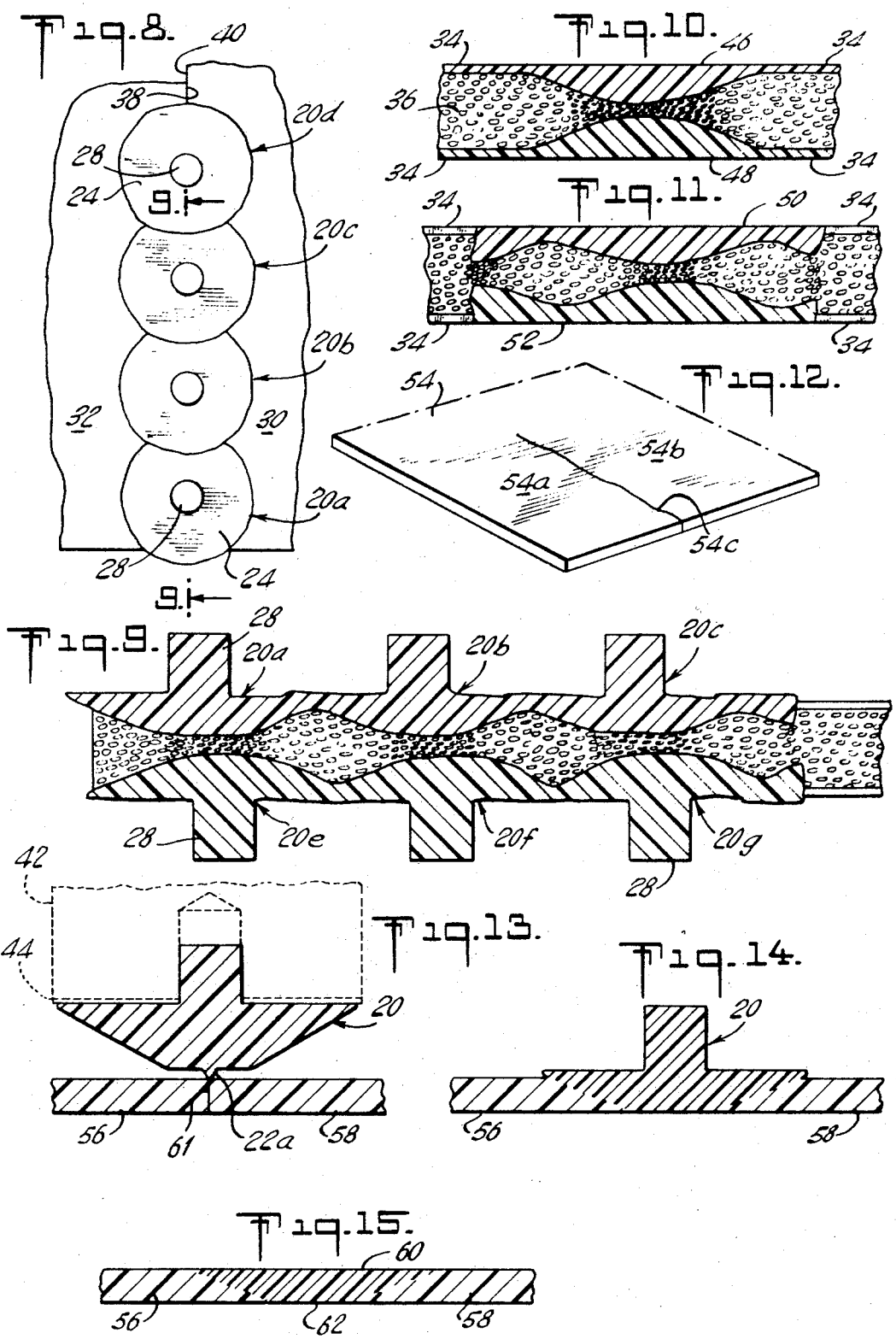

United States Patent Office 3,468,732
Patented Sept. 23, 1969

3,468,732
METHOD OF BUTT JOINING THERMOPLASTIC SHEET MATERIAL BY A SPIN WELDING OPERATION
Eugene E. Hewitt, Walkerton, Ind., assignor to Uniroyal, Inc., a corporation of New Jersey
Filed Aug. 19, 1966, Ser. No. 573,688
Int. Cl. B32b *31/12*
U.S. Cl. 156—73                                   11 Claims The present invention relates to welding.

In particular, the present invention relates to the welding of thermoplastic sheets to each other.

While at the present time there are various known methods for welding thermoplastic sheets together at abutting edges thereof, the known methods suffer from various disadvantages. These known methods include, for example, solvent welding, or the use of various cements, bolts, etc., all of which create great inconveniences and costs in the fabricating of structures. In fact, in many cases it is impossible from an economic or engineering standpoint to fabricate structures according to these known methods.

It is accordingly a primary object of the present invention to provide for the butt welding of thermoplastic sheet material a method which from the economic and engineering standpoints is completely satisfactory and practical in every way.

In particular, it is an object of the present invention to provide a method of this type which requires a minimum amount of materials and equipment for practicing the method.

Also, it is an object of the invention to provide a method where the materials and equipment required to practice the method are inexpensive and readily available.

Furthermore, it is an object of the present invention to provide a method of butt welding thermoplastic sheet material in such a way that a welded joint merges smoothly with the rest of the sheet material and can be rendered invisible.

Also, the objects of the present invention include the provision of a method which makes it possible to weld the sheet material with materials of the same properties as the sheet material which is welded, so that at the welded joint it is possible to provide various treatments, finishes, and the like which will in no way be different from such treatments, finishes, and the like applied to any part of the sheet material.

The objects of the present invention also include the provision of a welding method which can be carried out for the most part in a manual manner.

Also, it is an object of the present invention to provide a method which can be carried out at practically any location, such as in a fabricating plant as well as on the job.

Furthermore, it is an object of the present invention to provide a method of this type which lends itself not only to the initial fabricating of new structures but also to the repair of damaged structures.

Primarily, the present invention includes the placing of a pair of sheet material portions which are to be welded to each other in engagement with one edge of one thermoplastic sheet portion engaging an edge of the other thermoplastic sheet portion. With these thermoplastic sheet portions thus positioned with their edges engaging each other, a thermoplastic button is placed against one face of the sheet portions in a position extending across the abutting edges thereof. Then the button is spun with respect to the thermoplastic sheet portion while the sheet portions and button are pressed against each other, and the spinning and simultaneous pressure is provided at such an extent that there is frictionally created between the spinning button and the sheet portions a heat sufficient to melt the material of the button and sheet portions so that the button progressively enters into the body of the sheet portions. After the button has thus been displaced to a given extent into the body of the sheet portions, the spinning of the button is terminated and the molten material of the sheet portions and buttons is permitted to set and fuse, thus providing the welded joint which thereafter can be finished in any suitable way.

The invention is illustrated by way of example in the accompanying drawings which form part of this application and in which:

FIG. 1 is a perspective illustration of one possible embodiment of a thermoplastic button used in the method of the invention;

FIG. 2 is a transverse sectional elevation of the button of FIG. 1 taken along line 2—2 of FIG. 1 in the direction of the arrows;

FIG. 3 fragmentarily illustrates in a perspective view a pair of thermoplastic sheet portions which are to be welded to each other;

FIG. 4 is a perspective schematic representation of the method of the present invention;

FIG. 5 is a fragmentary transverse sectional elevation showing an initial stage of the method of the present invention;

FIG. 6 is a transverse sectional elevation fragmentarily illustrating at a scale somewhat larger than FIG. 5 a stage of the method of the invention subsequent to that to FIG. 5;

FIG. 7 is a transverse sectional elevation fragmentarily illustrating a stage of the method subsequent to that of FIG. 6;

FIG.8 is a top plan view of a pair of sheet portions welded to each other, the method being illustrated in FIG. 8 at a stage corresponding to that of FIG. 7;

FIG. 9 is a transverse sectional elevation of the structure of FIG. 8 taken along line 9—9 of FIG. 8 in the direction of the arrows;

FIG. 10 is a sectional elevation showing how the structure of FIG. 7 is subsequently finished;

FIG. 11 fragmentarily shows a structure of the type shown in FIG. 9 after subsequent finishing thereof;

FIG. 12 is a fragmentary illustration of a damaged thermoplastic sheet which can be repaired according to the method of the present invention;

FIG. 13 shows an initial stage in the method of the invention as applied to thermoplastic sheet material different from that shown in FIG. 5;

FIG. 14 shows a stage of the method of FIG. 13 subsequent to that of FIG. 13; and FIG. 15 illustrates the method of FIGS. 13 and 14 at a stage subsequent to that of FIG. 14 when the method has been completed.

The method of the present invention involves the use of thermoplastic buttons 20 which may have the structure shown in FIGS. 1 and 2. These thermoplastic buttons 20 have a flat bottom face 22 and a flat top face 24, and the buttons have a frustoconical exterior surface 26 extending between the flat faces 22 and 24. at the center of its flat bottom face each button has, as shown in FIG. 2, an integral downwardly projecting, conical tip 22a, which is not absolutely essential but is preferred for reasons pointed out below. In addition each thermoplastic button 20 has at its top face 24 a relatively short stem 28 extending upwardly away from the top face 24. Each button 20 is in the form of a single unitary body of thermoplastic material and these buttons are inexpensively manufactured in any suitable way, such as by molding from granular plastic material.

FIG. 3 illustrates an example of a pair of sheet material portions 30 and 32 which can be welded together according to the method of the present invention. These sheet material portions have outer thermoplastic laminations 34 which are separated from each other and joined together by a cellular expanded core structure 36.

In practicing the method of the invention the sheet material portions 30 and 32 are placed on any suitable support with the edge 38 of the sheet material portion 30 engaging and extending along the edge 40 of the sheet material portion 32. As is illustrated in FIG. 4, it is only required to hold the sheet material portions 30 and 32 against each other, with edges 38 and 40 abutting, in a purely manual manner. With the sheet material portions thus held against each other a first button 20a is situated against one face of the sheet material portions at a location engaging and extending across the abutting edges thereof, and this first button 20a is situated at one end of the sheet material portions, as indicated in FIG. 4. This button 20a is then acted upon in the manner shown for the button 20 in FIGS. 5 and 6.

Thus, referring to FIGS. 5 and 6, a button 20 is shown in FIG. 5 situated with its bottom face 22 adjacent the upper face of the sheet material portions 30 and 32 extending across the butting edges thereof. Tip 22a is the first part of the button to engage the sheets and is introduced between edges 38 and 40 to act in the manner of a center punch, providing a guide for the button and preventing skidding or skating of the button on the surface of the sheets. The stem 28 of the button 20 is placed within the lower cylindrical recess 42a of a rigid driver 42 which may be made of metal, for example. At its bottom end face, which is of the same diameter as top face 24 of the button, the driver 42 has high friction surface 44. For example, this bottom drive face can be roughened, or a ring of sand paper of a relatively course grade can be cemented to the bottom end of the driver 42, so as to provide the latter with a high friction surface for engaging substantially the entire top face 24 of the button surrounding stem 28. This driver 42 is then rapidly rotated about its axis so that the button 20 is spun with respect to the sheet material portions 30 and 32. Simultaneously with this spinning of the button with respect to the sheet material portions, these sheet material portions and the button are pressed against each other. The frictional spinning of the button 20 with respect to the sheet material portions creates between the button and the sheet material portions a heat which is sufficient to melt the thermoplastic material of the button as well as the thermoplastic material of the sheet material portions where the material of the button and sheet material portions engage each other, to create a puddle of molten thermoplastic material directly beneath the spinning button and into which the button progressively enters as a result of the pressure between the sheet material portions, on the one hand, and the button, on the other hand. As a result, during the continued spinning of the button the latter will progressively enter into the body of the sheet material portions with the puddle of molten thermoplastic material circumferentially spreading along the frustoconical surface 26 of the button. The large surface contact area between driver and button is not only desirable from the standpoint of improved frictional contact, but also supports the upper surface 24 of button 20 so that when the button is heated, by the rotational frictional contact with the sheet, the outer edge of the button is not allowed to bend upwardly due to the softening action of the heat.

This operation is continued until, for example, the top face 24 of the button is in the region of the upper face of the sheet material portions 30 and 32, and then the spinning of the button is terminated while the button remains in the position to which it has progressed and the molten plastic cools and sets, thus fusing the sheet material portions and button to each other to provide the structure shown in FIG. 6. As may be seen from FIG. 6, the button 20 as well as the sheet material portions have all fused together to form a unitary welded structure. The tip 22a and bottom face 22 of the button 20 of FIG. 6 has disappeared, and the part of the button in the region of its bottom face 22 as well as in the region of the surface 26 beneath the upper face of the sheet material portions 30 and 32 has melted into and become integral with the sheet material portions 30 and 32 which have themselves welded into each other.

When these operations are completed for the button 20a of FIG. 4, these operations are then carried out for the button 20b which is placed next to the button 20a partly overlapping the latter, so that part of the button 20a becomes welded to part of the button 20b during performance of these operations on the button 20b. Then the operations are successively repeated for the buttons 20c and 20d, and so on for a complete row of buttons arranged along the abutting edges 38 and 40. The structure will have at the upper face of the sheet material portions the construction shown in FIG. 8. The irregular peripheries shown for the buttons in FIG. 8 results from the puddling of the molten plastic.

Where the sheet material portions which are joined together are relatively thick in comparison to the buttons, as shown in FIG. 6, these sheet material portions are turned over and the above operations are repeated at the other side of the sheet material portions as indicated in FIG. 7. In this way it is possible to achieve the unitary structure shown in FIG. 7.

While the method is illustrated in connection with a single button in FIGS. 5 and 6 and a pair of buttons situated at the opposite faces of the thermoplastic sheets in FIG. 7, FIGS. 4, 8 and 9 show how a series of buttons are arranged along the edges which are to be butt welded to each other. As is apparent from FIG. 9, the row of buttons at one face need not be aligned with the row of buttons at the opposite face. FIG. 9 also demonstrates how the material of one button flows into the material of the adjoining buttons. FIG. 9 shows buttons 20e, 20f, and 20g integrally united with the sheet material portions at the face thereof opposed to that face where the buttons 20a–20c are located.

The structure shown in FIG. 7 can be finished at its opposed faces to provide the unitary structure shown in FIG. 10 where the surface 46 of the upper button is flush with and forms a continuation of the adjoining faces of the welded sheet material portions, and the same is true of the lower surface 48 of the lower button. This finishing can be brought about by suitable grinding away of the stems 28 and the top faces 24 until they are precisely flush with the exposed faces of the sheet material portions. It is possible to apply both rows of buttons to the opposed faces of the sheet material portions before any finishing takes place, or, if preferred, after one row of buttons are applied to one face of the butting sheet material portions, this row can be finished and then the structure can be turned over to have the welding and finishing operations repeated at the opposed face. FIG. 11 shows the structure of FIGS. 8 and 9 in its finished condition where the exposed surfaces of the buttons have been ground away to provide surfaces 50 and 52 which are flush with the adjoining exposed faces of the sheet material portions.

The use of the method of the invention with an expanded core type of plastic sheet material, as described above, is not at all essential. For example, FIG. 12 shows part of a sheet 54 of thermoplastic sheet material which has been accidentally torn or cut so that it has sheet material portions 54a and 54b which are provided with edges which abut each other along the tear or cut 54c which extends through the sheet material 54. It is possible to repair such sheet material, which is in the form of a single, one-ply thickness of sheet material according to the method of the invention shown in FIGS. 13–15.

Thus, referring to FIGS. 13–15 it will be seen that a sheet material portion 56 and a sheet material portion 58 are held against each other at adjoining edges 61 thereof, and a button 20 is placed against the upper face of these sheet material portions 56 and 58, with its tip 22a at adjoining edges 61, and acted upon, by way of a driver 42, as shown in dotted lines in FIG. 13, so as to be spun with respect to the sheet material portions while the latter and the button are pressed against each other, these sheet material portions 56 and 58 being held against any suitable support such as the top surface of a metal table, for example. With this construction also the friction generated between the spinning button and the sheet material portions will create heat sufficient to melt the thermoplastic material, producing puddling thereof and progressive entry of the button into the body of the sheet material, and these operations are continued until, for example, the stage shown in FIG. 14 is reached. In this case entry of a button from only one side of the pair of sheet material portions is required because the sheet material portions have a relatively small thickness as compared to that of the button 20. When the molten material has set to provide the unitary structure shown in FIG. 14, the resulting structure can be finished at its opposed faces, or only at the upper face, if desired, so as to produce the structure shown in FIG. 15 where the surface 60 is flush with the adjoining surfaces of the sheet material portions 56 and 58 and where the surface 62 is also flush with the adjoining surfaces of the sheet material portions.

As has been indicated above, the method of FIGS. 13–15 may be used to repair sheet material such as the sheet 54 shown in FIG. 12. For example, where an automobile has a body made of a thermoplastic sheet material, if it should happen that a fender or other part of the automobile becomes torn as shown at 54c for the sheet 54 in FIG. 12, it is possible for any mechanic in any repair shop to repair the tear in the plastic sheet material in the manner shown in FIGS. 13–15, and of course a row of buttons are situated in overlapping relation along the tear or cut in the manner indicated in FIG. 8. After the buttons have been fused to each other and to the sheet material, it is possible to grind away the excess button material until it is flush with the adjoining exposed surfaces of the sheet material portions such as the portions 54a and 54b.

The pressure with which the sheet material portions and the buttons are urged toward each other need not be very great and can be easily applied by the average individual. Thus, as is indicated in FIG. 4, all that is required to practice the method of the invention is to place the short stem 42b (FIG. 5) of driver 42 in the chuck of a hand-held drill such as a quarter-inch drill 64, and then with the purely manual operations indicated in FIG. 4 it is possible to practice the method of the invention. The shaft portion 42b of the driver is solid and is preferably kept short to reduce any "whipping" tendency. Inasmuch as a drill such as the drill 64 is in any event available in any repair shop, it is apparent that in order to practice the method of the invention on plastic automobile bodies it is only necessary to have on hand a driver 42 and a supply of the buttons 20.

Of course, the invention can be used for fabricating new structures as well as for repair purposes. For example, the method as shown in FIG. 4 can be used in the fabrication of plastic countertops and cabinets, and this method can be practiced at the place where such countertops or cabinets are installed, so that the sheets used to form these structures can be directly joined to each other on the job. In this case also, since a drill such as the drill 64 is in any event on hand, it is only necessary to have a driver 42 and a supply of buttons 20 in order to practice the invention.

The finishing operations can be carried out with a simple grinding wheel or disk, or the like, which can also be connected to the chuck of a drill such as the drill 64 so as to grind away the excess material.

The term "thermoplastic," as used herein, means or refers to materials which become soft and pliable when heated, without any change in inherent properties of the material. It is intended to include, without limitation thereto, resins such as: acrylonitrile-butadiene-styrene (ABS), polyvinyl chloride (PVC), whether plasticized or unplasticized; copolymers of vinyl chloride and copolymerizable monomers thereof (plasticized); fused highly plasticized polyvinyl chloride or vinyl chloride copolymers (fused plastisols); blends of vinyls and ABS; polyethylene (PE); polypropylene (PP); styrene-acrylonitrile copolymers; polystyrene; copolymers of styrene and such copolymerizable monomers as alpha methyl styrene; polystyrene blended with butadiene-styrene rubbery copolymers (high impact styrenes); polymethyl methacrylate esters and acrylic resins in general, including thermoplastic polymers or copolymers of acrylic acid, methacrylic acid, the esters of these acids such as the methyl, ethyl and butyl esters, or acrylonitrile; acetal resins such as those made by polymerizing formaldehyde; polycarbonate resins (PC) such as those produced by reacting bisphenol A and phosgene; polyamide resins known as nylons; and polymerized fluorinated hydrocarbons such as polytetrafluoroethylene (TFE).

The invention can be employed where the thermoplastic sheet material portions are each of the same kind of thermoplastic resin, and it can also be employed where the sheet material portions are different kinds of thermoplastic resins which are compatible with each other. Examples of resins which are compatible and will bond to one another using friction welding techniques are shown in the compatibility chart below. An X at the intersection of the horizontal and vertical column indicates the resins concerned which bond to one another using friction welding techniques. An O indicates the resins concerned which will not so bond to one another.

COMPATIBILITY CHART

|         | ABS | TFE | Acetal | Nylon | PVC | Acrylic | PE | PP | PC |
|---------|-----|-----|--------|-------|-----|---------|----|----|----|
| ABS     | X   | O   | X      | X     | X   | X       | O  | O  | X  |
| TFE     | O   | X   | O      | O     | O   | O       | O  | O  | O  |
| Acetal  | X   | O   | X      | O     | X   | X       | O  | O  | O  |
| Nylon   | X   | O   | O      | X     | X   | O       | O  | O  | X  |
| PVC     | X   | O   | X      | X     | X   | X       | O  | O  | X  |
| Acrylic | X   | O   | X      | O     | X   | X       | O  | O  | X  |
| PE      | O   | O   | O      | O     | O   | O       | X  | X  | O  |
| PP      | O   | O   | O      | O     | O   | O       | X  | X  | O  |
| PC      | X   | O   | O      | X     | X   | X       | O  | O  | X  |

U.S. Patents No. 2,439,202, No. 2,600,024 and No. 3,018,268, all assigned to the assignee of the present invention, describe suitable thermoplastic compositions which can be used in making either the sheet material portions or the buttons. U.S. Patents No. 3,041,220, No. 3,070,817 and No. 3,206,354, all assigned to the assignee of the present invention, describe cellular cored products, generally referred to as ABS expanded sheet materials, on which the present invention can be advantageously employed.

While the buttons of the invention can be of any size and can be used with thermoplastic sheets of any thickness, the invention has been successfully practiced with buttons which have a diameter on the order of one and one-eighth inch and a thickness between the faces 22 and 24 on the order of a quarter of an inch, the stem 28 also having a diameter on the order of approximately a quarter of an inch. These dimensions are only illustrative. The buttons will be used in a single row extending into the sheet material portions from only one side thereof, where the buttons are of the latter dimensions, approximately, in the case where the sheet material portions have a thickness of one-eighth of an inch or less. Where the thickness of the sheet material is substantially greater than one-eighth of an inch, the buttons will be introduced from the opposed faces where the buttons are of the above general dimensions. The method of the invention is used with sheet material which is stiff or capable of being flexed to some degree, although the invention generally will not be used with thin tissue or foil which is completely limp without having any resiliency. Thus the invention can be practiced with relatively thin plastic sheet material which has some flexibility without being in the form of a limp foil or tissue, while at the same time the invention can also be practiced with substantially rigid sheets.

As is apparent from FIG. 4, it is a relatively simple matter to hold the sheets against each other manually and in addition the heat which is generated is not so great as to make it impossible for the operator to hold his hands relatively close to the spinning button.

While the invention can be practiced with any combination of compatible materials as indicated in the above chart, it is also possible to practice the invention with identical thermoplastic materials for the sheet material portions and the buttons or with thermoplastic materials which have substantially identical properties, so that after the finishing operations are completed, the finished surface will have such properties as the same receptivity to paints and other finishing coats as is found in the joined sheet material portions.

Having thus described the invention, what is claimed is new and desired to be protected by Letters Patent is:

1. In a method of welding thermoplastic sheet material, the steps of placing a pair of thermoplastic sheet portions with an edge of one of said portions located against an edge of the other of said portions, placing a thermoplastic button against one face of both of said sheet portions in a position extending across and engaging said edges thereof, and pressing said button and sheet portions against each other while simultaneously spinning said button with respect to said sheet portions at a speed sufficient to frictionally create between said button and sheet portions a temperature which will melt the material of said sheet portions and button where they frictionally engage each other, so that during the spinning of said button with respect to said sheet portions the pressure of said sheet portions and button against each other will progressively displace said button into said sheet portions, and terminating the spinning of said button with respect to said sheet portions after said button has progressed to a given extent into said sheet portions, so that thereafter the molten material of said button and sheet portions will set and thereby weld said sheet portions to each other.

2. In a method as recited in claim 1, a plurality of said buttons being respectively placed against said sheet portions extending across said edges thereof at different locations along said edges, respectively, and said buttons being spun with respect to said sheet portions while the latter and said buttons are pressed toward each other to provide between said buttons and sheet portions sufficient friction for melting the material of said buttons and sheet portions while said buttons progress into said sheet portions to a given extent, and thereafter terminating the spinning of said buttons while the molten material of the buttons and sheet portions sets for fusing said sheet portions to each other at said edges.

3. In a method as recited in claim 2, said buttons being successively spun, one after another, with respect to said sheet portions.

4. In a method as recited in claim 2, said buttons being arranged along said one face of said sheet portions in a row extending along said edges with the successive buttons of said row overlapping each other.

5. In a method as recited in claim 4, said buttons of said row being successively spun one after another with respect to said sheet portions, so that each button except the first will be spun with respect to an immediately preceding button which it frictionally engages as well as with respect to said sheet portions, and said immediately preceding button melting together with said sheet portions so that said buttons of said row fuse together also.

6. In a method as recited in claim 1, said button and sheet portions being finished, subsequent to setting of the thermoplastic materials of said sheet portions and button, at said face of said sheet portions at the area of said button to provide the fused sheet portions with a smooth uninterrupted surface at the butt joint provided by the welding of said sheet portions to each other.

7. In a method as recited in claim 1, said sheet portions being manually held in a position where as edges engage each other during spinning of said button with respect to said sheet portions.

8. In a method as recited in claim 1, said button and sheet portions being manually pressed one toward the other during spinning of the button with respect to said sheet portions.

9. In a method as recited in claim 1, the properties of said thermoplastic sheet material portions and said button being substantially identical.

10. In a method as recited in claim 1, a plurality of said buttons respectively situated at different locations along said edges of said sheet portions being spun with respect to said sheet portions while the latter and said buttons are pressed one toward the other to provide fusing of said sheet portions to each other at the areas where said buttons are located, said buttons extending into said sheet portions from only one side thereof.

11. In a method as recited in claim 1, a plurality of said buttons being respectively situated at different locations along said edges and at opposed faces of said sheet portions and spun with respect to the latter while progressing into the material of said sheet portions from said opposed faces thereof, the spinning of all of said buttons being provided at a speed and pressure which will melt the material of said sheet portions and buttons so that upon termination of the spinning the material of said sheet portions and buttons which is molten will set and thereby weld said sheet portions and buttons to each other.

References Cited

UNITED STATES PATENTS

| | | | |
|---|---|---|---|
| 2,942,748 | 6/1960 | Anderson | 264—68 XR |
| 2,705,346 | 4/1955 | Schlabach et al. | 264—249 |
| 2,399,356 | 4/1946 | Klopstock et al. | |
| 2,751,321 | 6/1956 | Sans | 156—157 |

PHILIP DIER, Primary Examiner

U.S. Cl. X.R.

29—470.3; 156—154, 157, 298, 304, 306; 161—36; 228—2; 264—68, 249